W. HEMME.
Improvement in Carriage Running-Gear.
No. 129,954. Patented July 30, 1872.

Witnesses:
E. Wolff.
Geo. W. Mabee

Inventor:
W. Hemme
Per
Mann & Co.
Attorneys.

UNITED STATES PATENT OFFICE.

WILLIAM HEMME, OF MICHIGAN VALLEY, KANSAS.

IMPROVEMENT IN CARRIAGE RUNNING-GEARS.

Specification forming part of Letters Patent No. 129,954, dated July 30, 1872.

Specification describing a new and useful Improvement in Trucks and Brakes for Wagons, invented by WILLIAM HEMME, of Michigan Valley, in the county of Osage and State of Kansas.

Figure 1:
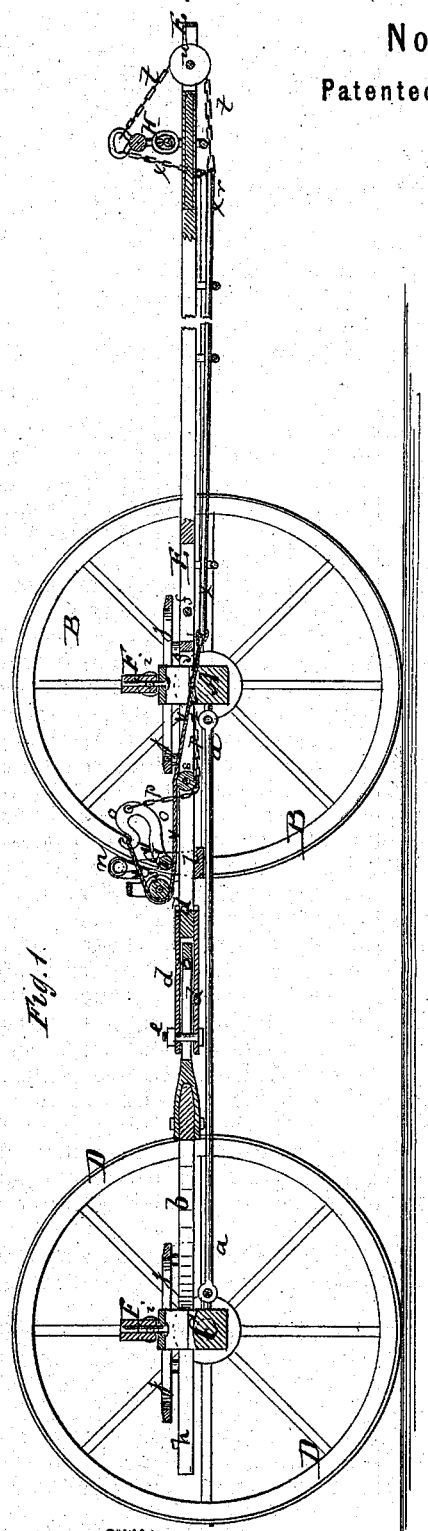
Figure 2:
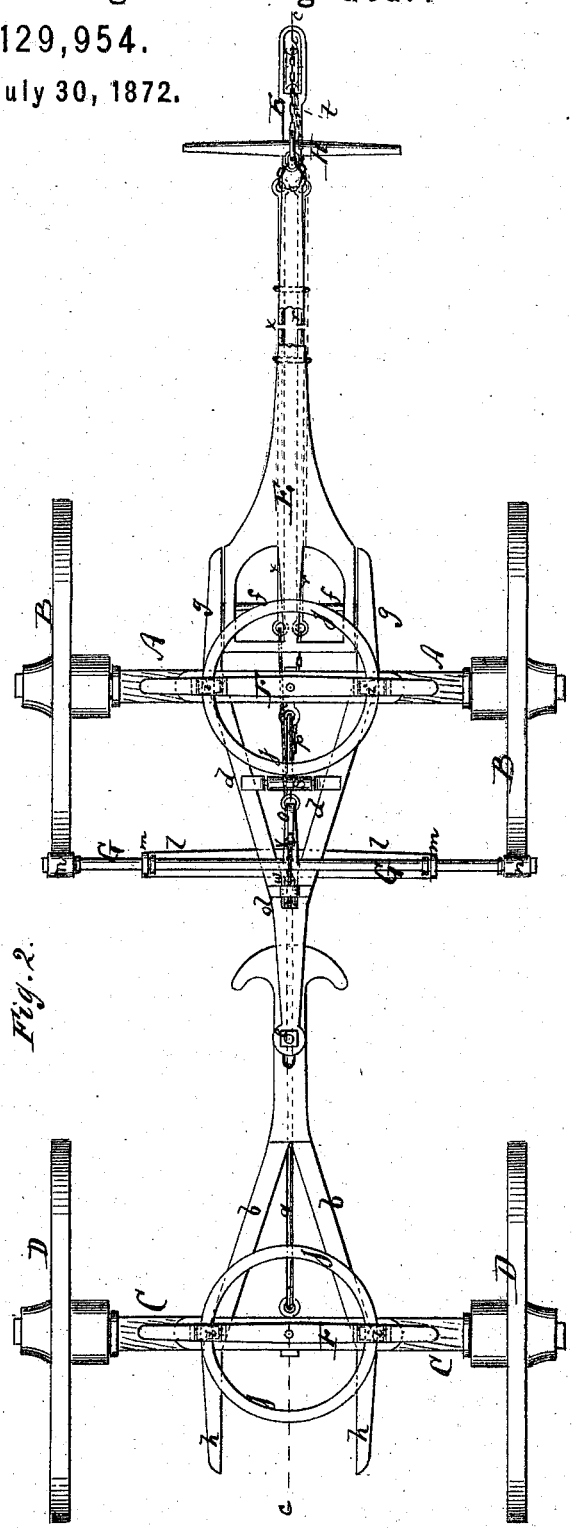

Figure 1 represents a vertical longitudinal section of my improved wagon truck and brake arrangement, the line c c, Fig. 1, indicating the plane of section. Fig. 2 is a top view of the same.

Similar letters of reference indicate corresponding parts.

The invention will first be fully described in connection with all that is necessary to a full understanding thereof, and then clearly pointed out in the claim.

A in the drawing represents the front axle of the wagon supported on the wheels B B. C is the hind axle of the same supported on the wheels D D. The two axles are connected with each other, not by a perch, as usually, but by a rod, a, which is jointed at both ends. This rod a keeps the axles in the middle a certain distance apart, and at the same time permits their being easily turned in a horizontal direction. b b are the hounds projecting forward from the rear axle; d d, the hounds projecting backward from the front axle. Where the hounds d meet they overlap the hounds b and are pivoted thereto by a pin, e, which passes through a slot in b, as shown. By this jointed connection at the hounds the hind axle will, whenever the front axle is turned, be swung in the opposite direction, carrying the hind wheels into the track in which the front wheels are running. The turning of the vehicle and its management are thereby materially facilitated. E is tongue of the wagon pivoted by a horizontal pin or bolt, f, between two jaws, g g, that project forward from the front axle or are continuations of the hounds d. Similar jaws h h project backward from the hind axle, as shown. The tongue can thus at any time be hitched to the rear of the wagon, which is often very desirable in extricating a vehicle from a position in which it cannot be conveniently or at all turned. F F are the bolsters, pivoted to the axles, respectively, and provided on their under sides each with two friction-rollers, i i, that rest on circular tracks j supported on the axles. The swinging horizontally of the axle under the bolsters is thus facilitated, for virtually the axles are pivoted to the bolsters—not the latter to the former. To the hounds d is affixed a crossbar, l, which, on projecting ears m at the ends, carries a rock-shaft, G, to the ends of which brake-shoes n n are secured. A goose-neck-shaped crank, o, of the shaft G is connected by a cord or chain, p, with a rod, r, which extends forward under and along the tongue, and is joined to the neck-yoke H. The chain p extends forward from the crank o and passes over a friction-roller, s, which is hung between the hounds d d. The chain t, which connects the front end of the rod r with the neck-yoke, passes over a friction-roller, u, which hangs in the front part of the tongue. Another chain, v, extends back from the crank o over a roller, w, and connects with a rod, x, which extends under and along the tongue to the neck-yoke. When the draft-animals are backed up so the neck-yoke is pulled back the rod r is drawn forward and the shaft G swung to apply the brakes. When, on the contrary, the neck-yoke is drawn forward by the proper advance of the vehicle, the rod x is pulled and the shaft G swung to detach the brake-shoes from the wheels.

Having thus described my invention, I claim as new and desire to secure by Letters Patent—

The combination, with axles A C, of rod a, jointed at each end to one of said axles, the slotted rear hound b, and the overlapping front hound d having pivot on end, all arranged as described, so that whenever the front axle is turned the rear one will be thrown round to make its wheels track with the front wheels.

WILLIAM HEMME.

Witnesses:
F. DUFFY,
GEORGE V. INGERSOLL.